United States Patent
Goodman et al.

(10) Patent No.: US 11,817,596 B2
(45) Date of Patent: Nov. 14, 2023

(54) RECHARGEABLE ENERGY STORAGE SYSTEM WITH BACKUP NETWORK

(71) Applicant: GM GLOBAL TECHNOLOGY OPERATIONS LLC, Detroit, MI (US)

(72) Inventors: Calvin Goodman, Auburn Hills, MI (US); Li-pen J. Ho, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 17/167,133

(22) Filed: Feb. 4, 2021

(65) Prior Publication Data

US 2022/0247031 A1    Aug. 4, 2022

(51) Int. Cl.
*H01M 50/298* (2021.01)
*B60L 53/00* (2019.01)
(Continued)

(52) U.S. Cl.
CPC .......... *H01M 50/298* (2021.01); *B60L 53/00* (2019.02); *B60L 58/26* (2019.02); *H01M 10/482* (2013.01);
(Continued)

(58) Field of Classification Search
CPC ............ H01M 50/298; H01M 10/482; H01M 10/613; H01M 10/625; H01M 10/6568;
(Continued)

(56) References Cited

U.S. PATENT DOCUMENTS

| 4,713,597 A | * | 12/1987 | Altmejd | H02J 7/0029 |
| | | | | 361/124 |
| 4,719,401 A | * | 1/1988 | Altmejd | H02J 7/00304 |
| | | | | 361/124 |

(Continued)

FOREIGN PATENT DOCUMENTS

| CN | 103855439 A | * | 6/2014 | .......... B60L 11/1874 |
| CN | 209785187 U | * | 12/2019 | .............. C23F 13/22 |
| JP | 2018073693 A | * | 5/2018 | |
| WO | WO-2017158375 A1 | * | 9/2017 | ............ B60L 3/0046 |

OTHER PUBLICATIONS

Research Disclosure, Disclosed anonymously, "Battery System Thermal Fault Detection, Warning and Notification", www.researchdisclosure.com, Research Disclosure database No. 658044, Feb. 2019, 3 pages.

*Primary Examiner* — Rexford N Barnie
*Assistant Examiner* — Swarna N Chowdhuri
(74) *Attorney, Agent, or Firm* — Quinn IP Law

(57) ABSTRACT

A rechargeable energy storage includes a battery pack having a plurality of battery modules between a negative terminal and a positive terminal. A backup network is electrically connected between the negative terminal and the positive terminal. The backup network includes a first diode and a second diode. A bypass junction located between a first portion of the battery pack and a second portion of the battery pack. The bypass junction electrically connects the battery pack and the backup network. The backup network is configured such that current flow is directed along a first pathway when open circuit state occurs in the first portion of the battery pack, and the current flow is directed along a second pathway when the open circuit state occurs in the second portion of the battery pack. The backup network enables powering of a designated load and/or a designated function during the open circuit state.

15 Claims, 3 Drawing Sheets

(51) Int. Cl.
*H01M 50/204* (2021.01)
*H01M 50/249* (2021.01)
*H01M 10/48* (2006.01)
*H01M 50/296* (2021.01)
*H01M 50/583* (2021.01)
*H01M 10/613* (2014.01)
*H01M 10/6568* (2014.01)
*H01M 10/625* (2014.01)
*B60L 58/26* (2019.01)
*H01M 50/581* (2021.01)

(52) U.S. Cl.
CPC ....... *H01M 10/613* (2015.04); *H01M 10/625* (2015.04); *H01M 10/6568* (2015.04); *H01M 50/204* (2021.01); *H01M 50/249* (2021.01); *H01M 50/296* (2021.01); *H01M 50/581* (2021.01); *H01M 50/583* (2021.01); *H01M 2200/103* (2013.01); *H01M 2220/20* (2013.01)

(58) Field of Classification Search
CPC ............ H01M 50/204; H01M 50/249; H01M 50/296; H01M 50/581; H01M 50/583; H01M 2200/103; H01M 2220/20; B60L 53/00; B60L 58/26; B60L 2240/545; B60L 1/02; B60L 3/0046; B60L 3/04; B60L 50/64; B60L 3/0092; Y02E 60/10; Y02T 10/70
USPC ............................................ 320/18; 307/10.1
See application file for complete search history.

(56) References Cited

U.S. PATENT DOCUMENTS

| | | | |
|---|---|---|---|
| 8,378,632 B2* | 2/2013 | Bourilkov | H02J 7/0024 307/41 |
| 9,738,161 B2 | 8/2017 | Goodman et al. | |
| 2002/0039270 A1* | 4/2002 | Sato | H02H 9/042 361/58 |
| 2006/0096266 A1* | 5/2006 | Dettmann | A01D 69/02 56/11.9 |
| 2008/0179040 A1* | 7/2008 | Rosenbaum | B60H 1/00385 219/209 |
| 2009/0024256 A1* | 1/2009 | Adams | G05D 23/1919 320/136 |
| 2011/0175573 A1* | 7/2011 | Ueki | H01M 10/44 320/116 |
| 2012/0225341 A1* | 9/2012 | Major | B60L 3/003 429/120 |
| 2013/0162045 A1* | 6/2013 | Weissenborn | H02J 7/00714 307/71 |
| 2013/0163137 A1* | 6/2013 | Johnston | H01L 31/0504 361/91.1 |
| 2014/0272491 A1* | 9/2014 | Kohlberger | H01M 50/581 429/61 |
| 2016/0308254 A1* | 10/2016 | Becker-Irvin | H01M 50/597 |
| 2016/0361990 A1* | 12/2016 | Porras | B60L 1/02 |
| 2017/0087957 A1* | 3/2017 | Blatchley | B60H 1/321 |
| 2017/0114741 A1* | 4/2017 | Ito | F02D 41/065 |
| 2017/0244259 A1* | 8/2017 | Tsuchiya | G01R 31/396 |
| 2019/0283626 A1* | 9/2019 | Staudenmaier | H01M 50/579 |

* cited by examiner

RECHARGEABLE ENERGY STORAGE SYSTEM WITH BACKUP NETWORK

INTRODUCTION

The present disclosure relates generally to a rechargeable energy storage system with a backup network and a vehicle incorporating the same. The use of rechargeable energy sources has greatly increased over the last few years. For example, mobile platforms, such as electric vehicles, may use rechargeable energy sources both as an exclusive source of energy and a non-exclusive source of energy. A rechargeable energy storage device with battery packs may store and release electrochemical energy as needed during a given operating mode. This electrochemical energy may be employed for propulsion, heating or cooling a cabin compartment, powering vehicle accessories and other uses.

SUMMARY

Disclosed herein is a rechargeable energy storage with a battery pack having a plurality of battery modules between a negative terminal and a positive terminal. A backup network is electrically connected between the negative terminal and the positive terminal, the backup network including a first diode and a second diode. A bypass junction is located between a first portion of the battery pack and a second portion of the battery pack. The bypass junction electrically connects the battery pack and the backup network. The backup network is configured such that current flow is directed along a first backup pathway when an open circuit state occurs in the first portion of the battery pack, the first backup pathway including the bypass junction and the first diode. The backup network is further configured such that the current flow is directed along a second backup pathway when the open circuit state occurs in the second portion of the battery pack, the second backup pathway including the bypass junction and the second diode. The backup network enables powering of at least one of a designated load and a designated function during the open circuit state.

The backup network includes a first connecting member, a second connecting member and a third connecting member. The first diode is operatively connected to the second diode via the first connecting member. The first diode is electrically connected with the negative terminal via the second connecting member. The second diode is electrically connected with the positive terminal via the third connecting member. The backup network includes a first fuse and a second fuse, the first fuse being located between the first diode and the first connecting member. The second fuse may be located between the second diode and the first connecting member.

In some embodiments, the first portion and the second portion represent a respective half portion of the battery pack. In other embodiments, the first portion and the second portion represent unequal portions of the battery pack. The rechargeable energy storage system may include a main circuit operatively connecting the battery pack to the designated load, with a first contactor selectively electrically connecting the positive terminal to the main circuit. A second contactor may selectively electrically connect the negative terminal to the main circuit. A current sensor may be configured to detect the current flow through the battery pack, the open circuit state being detected by the current sensor. The open circuit state may be caused by a thermal runaway event in at least one of the plurality of battery modules.

In some embodiments, a battery coolant circuit including a coolant pump is adapted to deliver a coolant to the battery pack. A battery chiller may be adapted to transfer thermal energy away from the battery coolant circuit. The designated load includes the battery coolant circuit and the battery chiller, with the designated function including cooling the battery pack to below a threshold temperature.

Disclosed herein is a vehicle having a rechargeable energy storage system including a battery pack. The battery pack has a negative terminal, a positive terminal and a plurality of battery modules arranged between the negative terminal and the positive terminal. A backup network is electrically connected between the negative terminal and the positive terminal, the backup network including a first diode and a second diode. The rechargeable energy storage system includes a bypass junction electrically connecting the battery pack and the backup network, the bypass junction being located between a first portion of the battery pack and a second portion of the battery pack. The backup network is configured such that a current flow is directed along a first backup pathway when an open circuit state occurs in the first portion of the battery pack, the first backup pathway including the bypass junction and the first diode.

The backup network is configured such that the current flow is directed along a second backup pathway when the open circuit state occurs in the second portion of the battery pack, the second backup pathway including the bypass junction and the second diode. The backup network enables powering of at least one of a designated load and a designated function during the open circuit state. The rechargeable energy storage system enables the vehicle to continue powering designated functions (e.g., high voltage functions) even if the battery pack develops a respective fault condition that would otherwise disable the designated functions.

In some embodiments, the designated load includes a battery coolant circuit and a battery chiller. The battery coolant circuit includes a coolant pump adapted to deliver a coolant to the battery pack, the designated function including cooling the battery pack to below a threshold temperature. The battery chiller is adapted to transfer thermal energy away from the battery coolant circuit. In some embodiments, the designated load is a drive unit including a traction motor. The designated function includes providing a limp home mode. In some embodiments, a device controller adapted to interface with the rechargeable energy storage system. The rechargeable energy storage system includes a control unit adapted to wake up the device controller when the open circuit state occurs. The open circuit state may be caused by a thermal runaway event in at least one of the plurality of battery modules.

The above features and advantages and other features and advantages of the present disclosure are readily apparent from the following detailed description of the best modes for carrying out the disclosure when taken in connection with the accompanying drawings.

DETAILED DESCRIPTION

Figure 1:
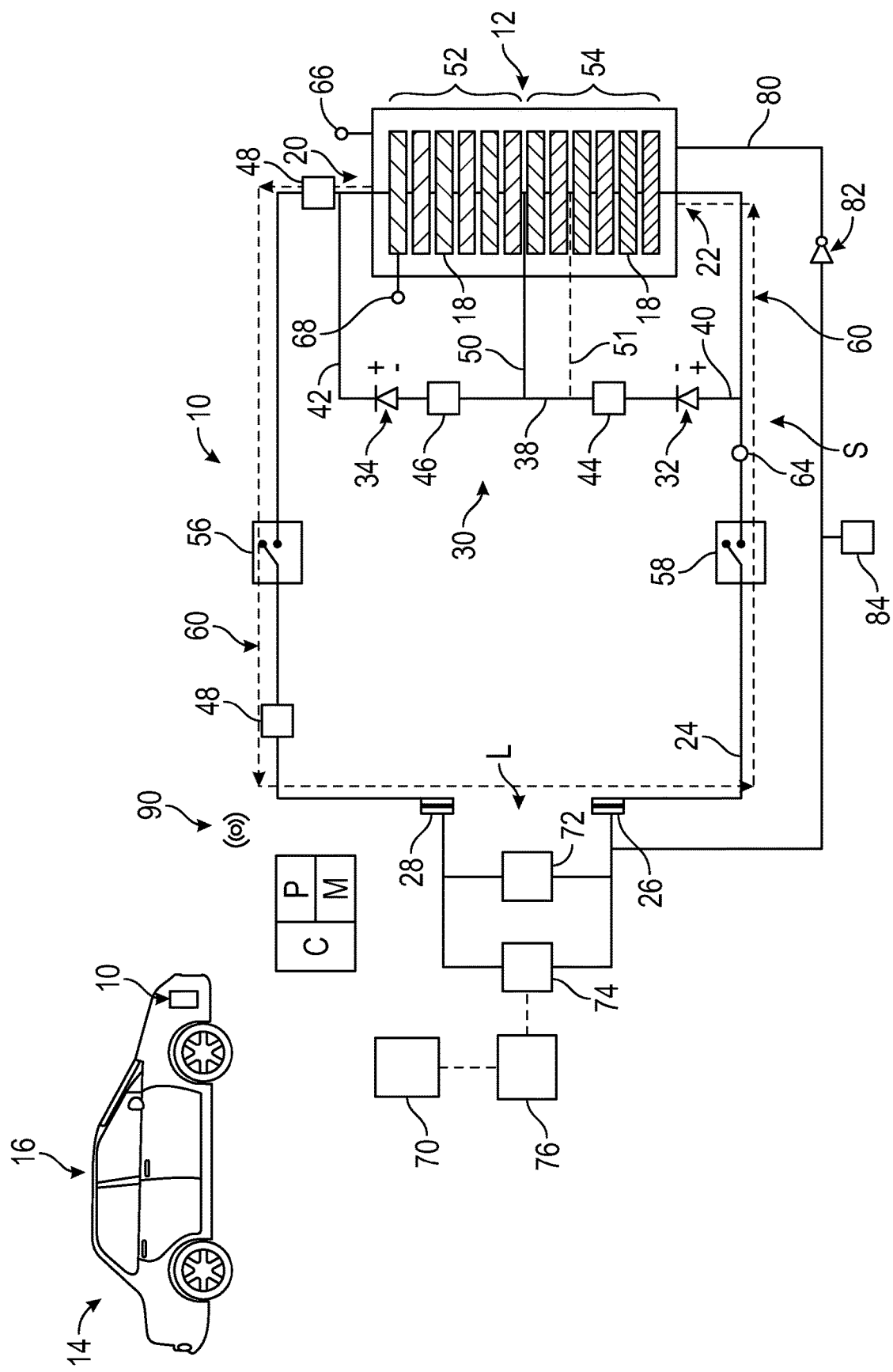
FIG. 1 is a schematic illustration of a rechargeable energy storage system.
Figure 2:
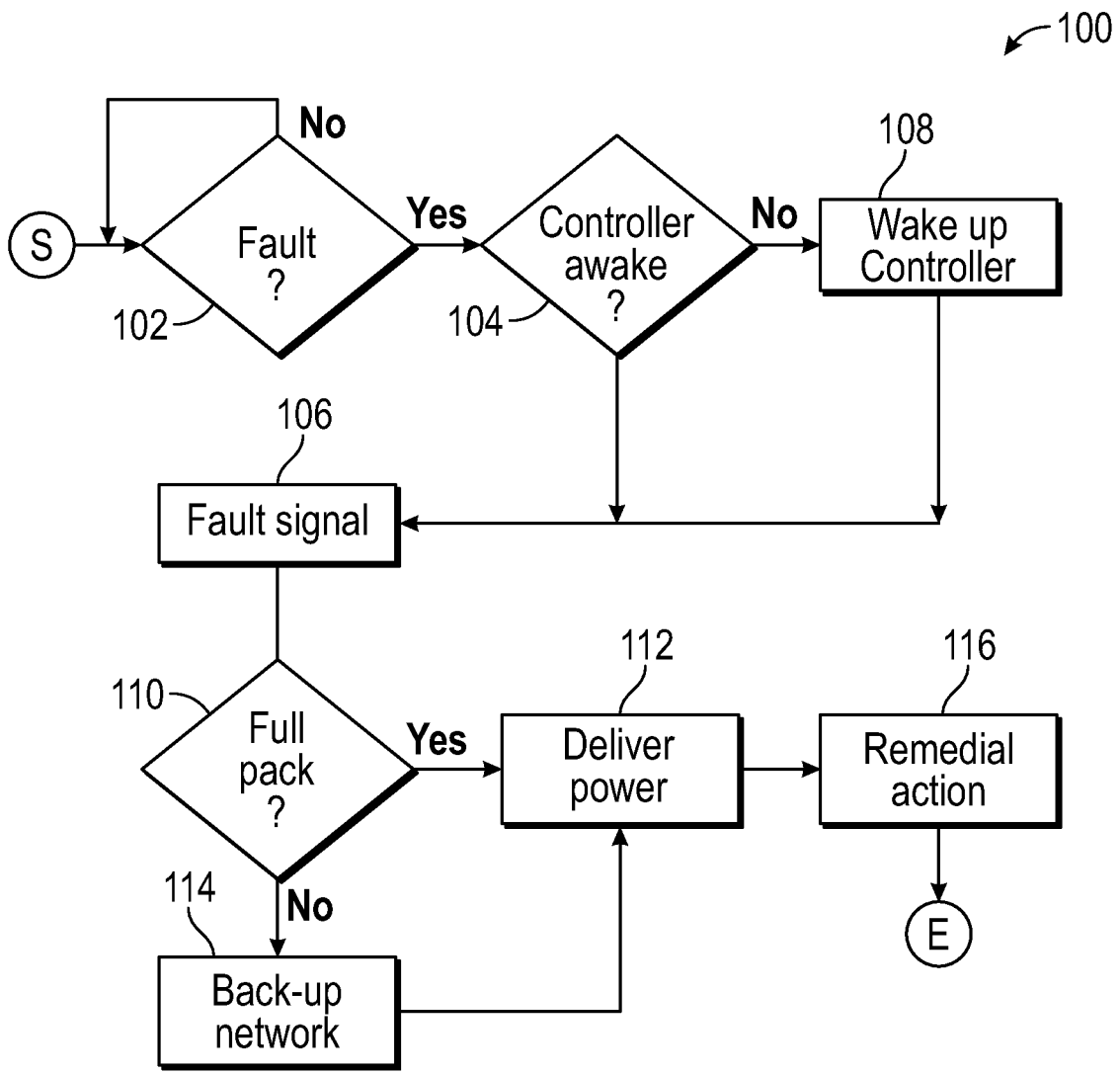
FIG. 2 is a schematic flow diagram of a method for operating the rechargeable energy storage system of FIG. 1.
Figure 3:
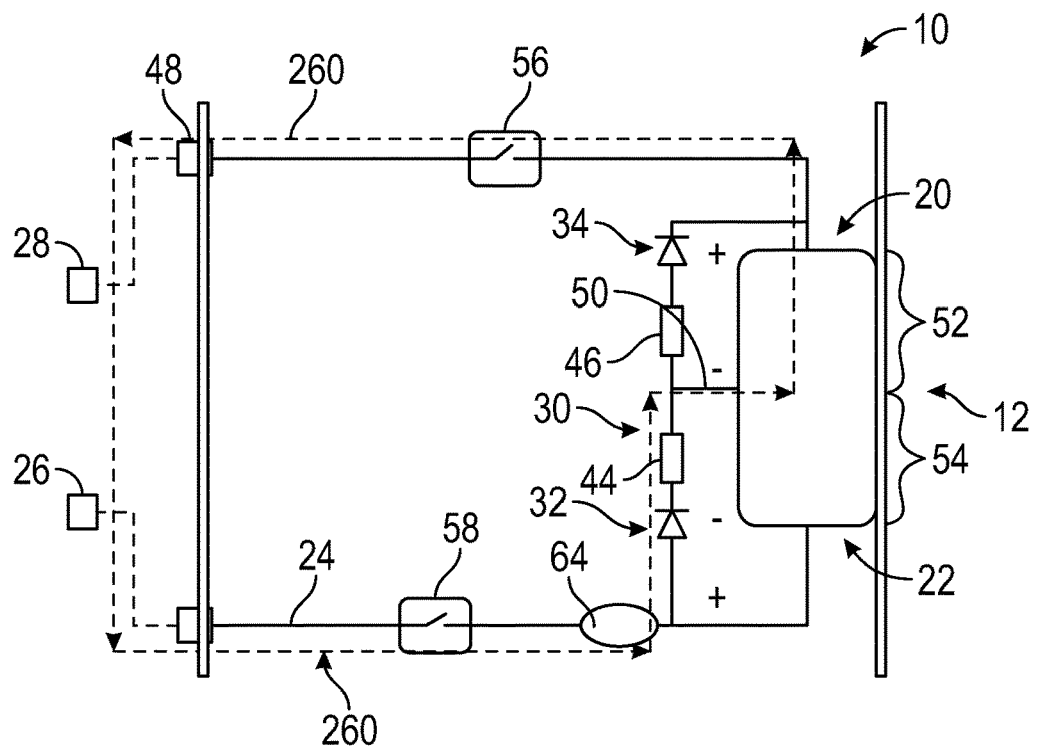
FIG. 3 is a schematic fragmentary illustration of the rechargeable energy storage system of FIG. 1, showing a first backup pathway.

Referring to the drawings, wherein like reference numbers refer to like components, FIGS. 1-3 schematically illustrate a rechargeable energy storage system 10 having at least one battery pack 12 ("at least one" omitted henceforth). Referring to FIG. 1, the rechargeable energy storage system 10 may be located in a device 14. The device 14 may be a mobile platform (e.g., vehicle 16) such as, but not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane and train. The device 14 may be a non-mobile platform, such as a computer, computing device, manufacturing equipment and electrical equipment. It is to be understood that the device 14 may take many different forms and have additional components.

Referring to FIGS. 1-3, the battery pack 12 includes a plurality of battery modules 18 ("plurality of" omitted henceforth) between a positive terminal 20 and a negative terminal 22. The battery modules 18 are composed of individual cells. The individual cells may include battery cells having different chemistries, including but not limited to, lithium-ion, lithium-iron, nickel metal hydride and lead acid batteries. It is understood that the number of cells per module and the number of modules per battery pack may be varied based on the application at hand.

The battery pack 12 may be manufactured in sets of electrodes, assembled into individual cells, which are then assembled into battery modules 18 to form the battery pack 12. A fault in one of the battery modules 18 can cause the entirety of the battery pack 12 to stop functioning. The fault may be reflected in an open circuit state. An open circuit may be described as a broken path for current flow. An open circuit state implies that the two opposing terminals are externally disconnected (with a resistance of infinity) such that zero current may flow between the two opposing terminals, regardless of the voltage difference.

Referring to FIG. 1, a main circuit 24 operatively connects the battery pack 12 to various components of the device 14, via a first connector 26 and a second connector 28. As described below, the rechargeable energy storage system 10 enables the device 14 to continue powering a designated load and/or designated functions (e.g., high voltage functions) when the battery pack 12 develops an internal open circuit that would otherwise disable the designated functions.

Referring to FIGS. 1-3, the rechargeable energy storage system 10 includes a backup network 30 electrically connected between the negative terminal 22 and the positive terminal 20. The backup network 30 includes a first diode 32 and a second diode 34. As shown in FIG. 1, the backup network 30 includes a plurality of connectors, such as a first connecting member 38, a second connecting member 40 and a third connecting member 42, which may be wires or other conductors of electricity. At one end, the first diode 32 is operatively connected to the second diode 34 via the first connecting member 38. At another end, the first diode 32 is electrically connected with the negative terminal 22 via the second connecting member 40. The second diode 34 is electrically connected with the positive terminal 20 via the third connecting member 42.

Figure 4:
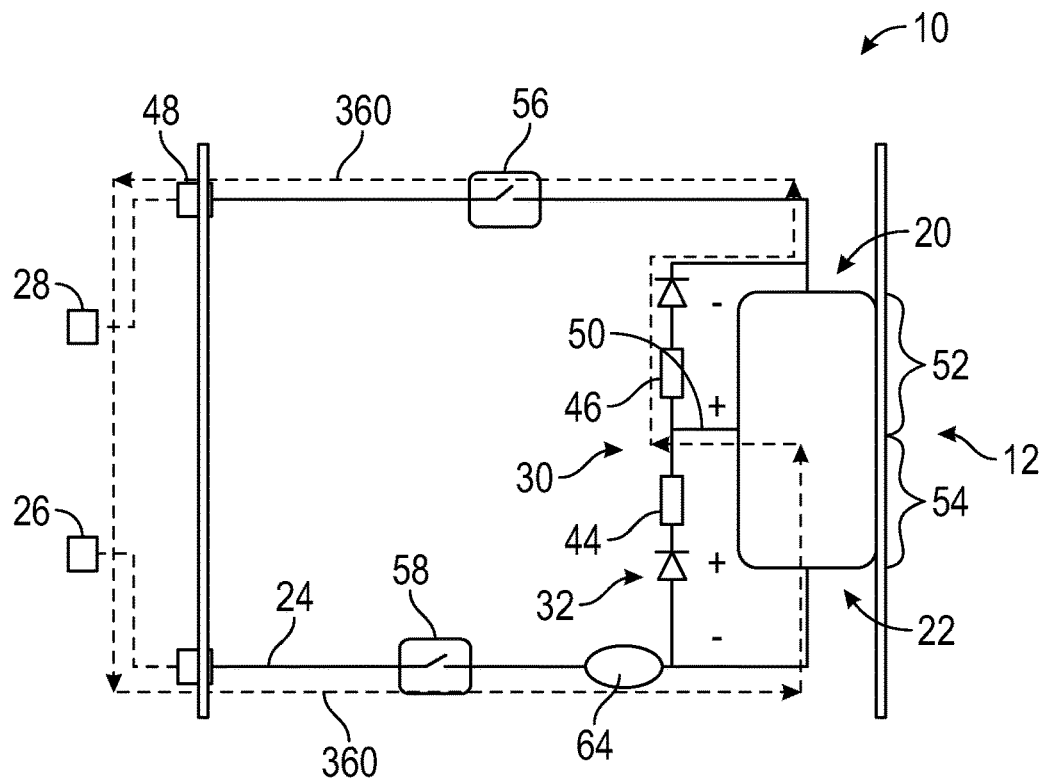
FIG. 4 is a schematic fragmentary illustration of the rechargeable energy storage system of FIG. 1, showing a second backup pathway.

If the battery pack 12 (which may be a high voltage pack) in a device 14 (e.g., vehicle 16) develops an internal open circuit state, the backup network 30 allows the un-faulted portion of the battery pack 12 to provide power to at least one designated load L (which may be high voltage loads) of the vehicle 16 at a fraction of the normal voltage. In other words, the backup network 30 enables the powering of at least one designated load L and/or a designated function in the event of an internal fault condition. FIGS. 3-4 illustrate a first backup pathway 260 and a second backup pathway 360, as described below.

Referring to FIGS. 1-3, the backup network 30 includes a first fuse 44 and a second fuse 46, with the first fuse 44 being located between the first diode 32 and the first connecting member 38. The second fuse 46 is located between the second diode 34 and the first connecting member 38. The rechargeable energy storage system 10 may include additional fuses 48 to prevent short circuits, and other electronic circuitry and components not shown. Referring to FIG. 1, a first contactor 56 selectively electrically connects the positive terminal 20 to the main circuit 24 and a second contactor 58 selectively electrically connects the negative terminal 22 to the main circuit 24.

Referring to FIGS. 1-3, a bypass junction 50 electrically connects the battery pack 12 and the backup network 30. The bypass junction 50 is located between a first portion 52 and a second portion 54 of the battery pack 12. In other words, the battery pack 12 is divided into the first portion 52 and the second portion 54 based on the location of the bypass junction 50. In some embodiments, the first portion 52 and the second portion 54 represent a respective half portion of the battery pack 12. In other embodiments, the first portion 52 and the second portion 54 represent unequal portions of the battery pack 12, as shown by bypass junction 51 (in phantom) in FIG. 1. For example, bypass junction 51 may be divided into respective one-third and two-third portions.

When the rechargeable energy storage system 10 is in a non-fault mode, current flow is directed along a pathway 60, as shown in FIG. 1. In the non-fault mode, current flow along the backup network 30 is prevented by the orientation/positioning of the first diode 32 and second diode 34 and the induced potential difference. As understood by those skilled in the art, current through a diode flows from the anode to the cathode.

Referring now to FIG. 3, when an open circuit state occurs in the second portion 54 of the battery pack 12, the backup network 30 is configured such that current flow is directed along a first backup pathway 260. The first backup pathway 260 includes the bypass junction 50 and the first diode 32. A faulted negative state (where the fault condition is in the second portion 54 adjacent to the negative terminal 22) of the battery pack 12 creates a negative potential difference (negative to positive) across the second diode 34, as shown in FIG. 3, and vice-versa across the first diode 32. Because current flows from positive to negative, the current flow is blocked. Hence, in the faulted negative state, the current flow through the second diode 34 is blocked, while the current flow through the first diode 32 is enabled.

Referring to FIG. 4, the backup network 30 is further configured such that the current flow is directed along a second backup pathway 360 when the open circuit state occurs in the first portion 52 of the battery pack 12. The second backup pathway 360 includes the bypass junction 50 and the second diode 34. A faulted positive state (where the fault condition is in one of the battery modules 18 adjacent to the positive terminal 20) of the battery pack 12 creates a negative potential difference (negative to positive) across the first diode 32, as shown in FIG. 4, and vice-versa across the second diode 34. Because current flows from positive to negative, the current flow is blocked. Hence, in a faulted positive state, the current flow through the first diode 32 is blocked and the current flow through the second diode 34 is enabled.

Referring to FIG. 1, the rechargeable energy storage system 10 includes a control unit C having at least one processor P and at least one memory M (or non-transitory, tangible computer readable storage medium) on which instructions may be recorded for executing a method 100 for operating the rechargeable energy storage system 10. Method 100 is described below with respect to FIG. 2. The memory M can store executable instruction sets, and the processor P can execute the instruction sets stored in the memory M.

The control unit C may receive input from one or more sensors S ("one or more" omitted henceforth) in the rechargeable energy storage system 10. The sensors may include such as a current sensor 64, a pack sensor 66 and a module sensor 68. The pack sensor 66 and a module sensor 68 may be configured to obtain data related to temperature, voltage, current, state of charge, capacity, state of health and other factors of different components of the battery pack 12. Sensor technologies available to those skilled in the art may be employed. The control unit C may be in communication with a device controller 70.

Notwithstanding, it is to be understood that the rechargeable energy storage system 10 may operate passively and may function without additional software, sensors, or actuators. In other words, as long as the first contactor 56 and the second contactor 58 are connected, the backup network 30 may automatically come into operation when a respective fault condition occurs; directing current flow along the first backup pathway 260 (see FIG. 3) in a faulted negative state and the second backup pathway 360 (see FIG. 3) in a faulted positive state. Where the first portion 52 and second portion 54 include an equal number of battery modules 18, the backup network 30 may automatically switch to providing half the power of the battery pack 12 in such an event.

Referring now to FIG. 2, a flowchart of the method 100 is shown. Method 100 may be embodied as computer-readable code or instructions stored on and partially executable by the control unit C of FIG. 1. The method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 2, the method 100 includes determining if an open circuit state (caused by a respective fault condition) has occurred, via input from the sensors S (e.g., readings from the current sensor 64). If so, the method 100 proceeds to block 104, and if not, it loops back to block 102. In some embodiments, the respective fault condition is a thermal runaway event in at least one of the battery modules 18. A thermal runaway may be defined as uncontrollable increase in temperature that potentially causes undesired effects.

Per block 104, the method 100 determines if the device controller 70 is awake. If so, the method 100 proceeds to block 106. The device 14 may operate in a number of operating states where the device controller 70 is awake, for example, a driving mode, a charging mode and an accessory mode (e.g., propulsion disabled with active high voltage). The device 14 may also operate in an off mode where the device controller 70 is asleep. If the device controller 70 is not awake, per block 108, the control unit C may be configured to "wake up" the device controller 70, for example, by sending a wake-up signal to the vehicle controller 70. The method 100 then proceeds to block 106.

Per block 106 of FIG. 2, the method 100 includes ensuring that the first contactor 56 and the second contactor 58 are closed and sending out a fault signal. In some embodiments, the fault signal includes commanding operation of a battery coolant circuit 80. The method 100 proceeds to block 110, where the control unit C is adapted to determine if the full pack of the battery pack 12 is available. If the full pack is available, power to the at least one designated load L is delivered, per block 112. If the full pack is not available, the method 100 defaults to the backup network, per block 114, and proceeds to block 112.

Per block 112, power is delivered to the designated load L for one or more designated functions. Referring to FIG. 1, the designated load L may include, but is not limited to, an auxiliary power mode 72 and a power inverter module 74 (e.g., TPIM). The designated load L may include a drive unit 76 (e.g., including a traction motor) and the designated function may include providing a limp home mode for the vehicle 16. As understood by those skilled in the art, the limp home mode is an operating mode that allows the vehicle 16 to move with reduced power.

The designated load L may include a battery coolant circuit 80 and the designated function may include providing power for active coolant mitigation when a thermal propagation event causes the open circuit. The battery coolant circuit 80 includes a coolant pump 82 adapted to deliver a coolant to the battery pack 12 and an evaporator or battery chiller 84 adapted to transfer thermal energy away from the battery coolant circuit 80. The battery coolant circuit 80 delivers coolant via a coolant pump 82 for purposes of regulating the temperature of the battery pack 12. In some embodiments, the battery chiller 84 is a compact plate-to-plate heat exchanger that transfers thermal energy from the battery coolant circuit 80 to a refrigerant loop (not shown) in the vehicle 16 to maintain optimum battery temperatures. The rechargeable energy storage system 10 may be employed as part of a battery thermal management system to increase the lifetime of the battery pack 12 (e.g., having lithium-ion cells) by regulating its temperature levels.

The method 100 of FIG. 2 may include block 116, where the control unit C may be programmed to run further diagnostic tests and/or ascertain whether remedial action is warranted. Remedial action may include sending a diagnostic report to a user, owner or fleet manager of the device 14 via a wireless network 90, for example, to schedule a maintenance check or follow up. The method 100 is then ended.

Referring to FIG. 1, the sensors S may be in communication with the control unit C via the wireless network 90, which may be a short-range network or a long-range network. The wireless network 90 may be a communication BUS, which may be in the form of a serial Controller Area Network (CAN-BUS). The wireless network 90 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. Other types of connections may be employed.

In summary, the rechargeable energy storage system 10 enables the device 14 (e.g., vehicle 16) to continue powering designated functions (e.g., high voltage functions) even if the battery pack 12 develops a fault condition that would otherwise disable the designated functions. Accordingly, the rechargeable energy storage system 10 improves the functioning of the device 14. Furthermore, the rechargeable energy storage system 10 supports multiple pack designs, without causing wear on the battery pack 12, as well as early fault detection and signaling/notification of first responders.

The flowchart in FIG. 2 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based energy systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The control unit C (and device controller 70) includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file energy system, an application database in a proprietary format, a relational database energy management energy system (RDBMS), etc. Each such data store may be included within a computing device employing a computer operating system such as one of those mentioned above and may be accessed via a network in one or more of a variety of manners. A file system may be accessible from a computer operating energy system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A rechargeable energy storage system comprising:
a battery pack having a negative terminal, a positive terminal, and a plurality of battery modules arranged between the negative terminal and the positive terminal;
a backup network electrically connected between the negative terminal and the positive terminal, the backup network including a first diode and a second diode;
a bypass junction electrically connecting the battery pack and the backup network, the bypass junction dividing the battery pack into a first portion of the battery pack and a second portion of the battery pack;
a battery coolant circuit including a coolant pump adapted to deliver a coolant to the battery pack;
a battery chiller adapted to transfer thermal energy away from the battery coolant circuit;
wherein the battery pack has only one bypass junction;
wherein the first portion of the battery pack and the second portion of the battery pack each respectively include two or more of the plurality of battery modules;
wherein the backup network is configured such that a current flow is directed along a first backup pathway when an open circuit state occurs in the first portion of the battery pack, the first backup pathway including the bypass junction and the first diode, the open circuit state being caused by a thermal runaway event in at least one of the plurality of battery modules;
wherein the backup network is configured such that the current flow is directed along a second backup pathway when the open circuit state occurs in the second portion of the battery pack, the second backup pathway including the bypass junction and the second diode;
wherein the designated load includes the battery coolant circuit and the battery chiller, the designated function including cooling the battery pack to below a threshold temperature; and
wherein the backup network enables powering of at least one of a designated load and a designated function during the open circuit state.

2. The rechargeable energy storage system of claim 1, wherein:
the backup network includes a first connecting member, a second connecting member and a third connecting member, the first diode being operatively connected to the second diode via the first connecting member;
the first diode is electrically connected with the negative terminal via the second connecting member; and
the second diode is electrically connected with the positive terminal via the third connecting member.

3. The rechargeable energy storage system of claim 2, wherein:
the backup network includes a first fuse and a second fuse, the first fuse being located between the first diode and the first connecting member; and
the second fuse is located between the second diode and the first connecting member.

4. The rechargeable energy storage system of claim 1, wherein:
the first portion and the second portion of the battery pack represent a respective half portion of the battery pack.

5. The rechargeable energy storage system of claim 1, wherein:
the first portion and the second portion of the battery pack represent unequal portions of the battery pack.

6. The rechargeable energy storage system of claim 1, further comprising:
a main circuit operatively connecting the battery pack to the designated load;
a first contactor selectively electrically connecting the positive terminal to the main circuit; and
a second contactor selectively electrically connecting the negative terminal to the main circuit.

7. The rechargeable energy storage system of claim 1, further comprising:
a current sensor configured to detect the current flow through the battery pack, the open circuit state being detected by the current sensor.

8. A vehicle comprising:
a rechargeable energy storage system including a battery pack having a negative terminal, a positive terminal and a plurality of battery modules arranged between the negative terminal and the positive terminal;
wherein the rechargeable energy storage system includes a battery coolant circuit having a coolant pump adapted to deliver a coolant to the battery pack, and a battery chiller adapted to transfer thermal energy away from the battery coolant circuit;
wherein the rechargeable energy storage system includes a backup network electrically connected between the negative terminal and the positive terminal, the backup network including a first diode and a second diode;
wherein the rechargeable energy storage system includes a bypass junction electrically connecting the battery pack and the backup network, the bypass junction dividing the battery pack into a first portion of the battery pack and a second portion of the battery pack;
wherein the battery pack has only one bypass junction;
wherein the first portion of the battery pack and the second portion of the battery pack each respectively include two or more of the plurality of battery modules;
wherein the backup network is configured such that a current flow is directed along a first backup pathway when an open circuit state occurs in the first portion of the battery pack, the first backup pathway including the bypass junction and the first diode, the open circuit state being caused by a thermal runaway event in at least one of the plurality of battery modules;
wherein the backup network is configured such that the current flow is directed along a second backup pathway when the open circuit state occurs in the second portion of the battery pack, the second backup pathway including the bypass junction and the second diode; and
wherein the backup network enables powering of at least one of a designated load and a designated function during the open circuit state, the designated load including the battery coolant circuit and the battery chiller, the designated function including cooling the battery pack to below a threshold temperature.

9. The vehicle of claim 8, wherein:
the designated load further includes a drive unit including a traction motor; and
the designated function includes providing a limp home mode.

10. The vehicle of claim 8, wherein:
the backup network includes a first connecting member, a second connecting member and a third connecting member, the first diode being operatively connected to the second diode via the first connecting member;
the first diode is electrically connected with the negative terminal via the second connecting member; and
the second diode is electrically connected with the positive terminal via the third connecting member.

11. The vehicle of claim 10, wherein:
the backup network includes a first fuse and a second fuse, the first fuse being located between the first diode and the first connecting member; and
the second fuse is located between the second diode and the first connecting member.

12. The vehicle of claim 8, wherein:
the first portion and the second portion of the battery pack represent a respective half portion of the battery pack.

13. The vehicle of claim 8, wherein:
the first portion and the second portion of the battery pack represent unequal portions of the battery pack.

14. The vehicle of claim 8, wherein:
the rechargeable energy storage system includes a main circuit operatively connecting the battery pack to the designated load;
a first contactor selectively electrically connecting the positive terminal to the main circuit; and
a second contactor selectively electrically connecting the negative terminal to the main circuit.

15. The vehicle of claim 8, further comprising:
a device controller adapted to interface with the rechargeable energy storage system; and
wherein the rechargeable energy storage system includes a control unit adapted to wake up the device controller when the open circuit state occurs.

* * * * *